United States Patent
Bingham et al.

(10) Patent No.: US 11,285,604 B2
(45) Date of Patent: Mar. 29, 2022

(54) ROBOT COLLISION DETECTION USING CASCADING VARIATIONAL AUTOENCODER

(71) Applicant: X Development LLC, Mountain View, CA (US)

(72) Inventors: Jeffrey Bingham, Sunnyvale, CA (US); Jianlan Luo, Berkeley, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 244 days.

(21) Appl. No.: 16/725,685

(22) Filed: Dec. 23, 2019

(65) Prior Publication Data

US 2021/0316455 A1    Oct. 14, 2021

(51) Int. Cl.
*B25J 9/16* (2006.01)

(52) U.S. Cl.
CPC .................. *B25J 9/1666* (2013.01)

(58) Field of Classification Search
CPC ......... B25J 9/1666; G06N 3/08; G06N 3/084; G06N 3/088
See application file for complete search history.

(56) References Cited

U.S. PATENT DOCUMENTS

2020/0310370 A1* 10/2020 Bogo ................ G06N 3/084

OTHER PUBLICATIONS

B. Ichter and M. Pavone, "Robot Motion Planning in Learned Latent Spaces," in IEEE Robotics and Automation Letters, vol. 4, No. 3 , pp. 2407-2414, Jul. 2019, doi: 10.1109/LRA.2019.2901898. (Year: 2019).*
European Patent Office; Communication issued in Application No. 20216958.7; 12 pages; dated Sep. 28, 2021.
Mousavian et al.; 6-DOF GraspNet: Variational Grasp Generation for Object Manipulation; 2019 IEEE/CVF; pp. 2901-2910; dated Oct. 27, 2019.
Ichter et al.; Robot Motion Planning in Learned Latent Spaces; IEEE Robotics and Automation Letter; vol. 4, No. 3; pp. 2407-2414; dated Jul. 1, 2019.

* cited by examiner

*Primary Examiner* — Khoi H Tran
*Assistant Examiner* — Nhi Q Bui
(74) *Attorney, Agent, or Firm* — Middleton Reutlinger (57) ABSTRACT

Cascading variational autoencoder ("VAE") models can be used to detect robot collisions while a robot is performing a task. For a current state of the robot, various implementations include a VAE used to generate a latent space of the current state, and a predictor network used to generate a predicted latent space for the current state. A collision can be determined based on a difference between the latent space for the current state and the predicted latent space for the current state.

20 Claims, 7 Drawing Sheets

ROBOT COLLISION DETECTION USING CASCADING VARIATIONAL AUTOENCODER

BACKGROUND

Many robots are programmed to utilize one or more end effectors to grasp one or more objects. For example, a robot may utilize a grasping end effector such as an "impactive" gripper or "ingressive" gripper (e.g., physically penetrating an object using pins, needles, etc.) to pick up an object from a first location, move the object to a second location, and drop off the object at the second location. Some additional examples of robot end effectors that may grasp objects include "astrictive" end effectors (e.g., using suction or vacuum to pick up an object) and one or more "contigutive" end effectors (e.g., using surface tension, freezing or adhesive to pick up an object), to name just a few.

SUMMARY

Techniques are described herein for determining, using a cascading variational autoencoder (VAE) network and while a robot is performing a task, whether a robot collision has occurred. Robots can perform a variety of tasks such grasping tasks, navigation tasks, and/or additional and/or alternative tasks. However, collisions can occur while a robot is performing the task. For example, a collision can occur when the robot collides with something in its environment while performing the task, such as an object that was not visible to the robots sensor(s) and/or that was misrecognized by the robot. Also, for example, a collision can occur when something collides with the robot (through no fault of the robot) while the robot is performing the task, such as a falling object, a thrown ball, etc. Collision detection is a determination made by the robot that a collision has occurred. In some implementations, detection of a collision allows the robot to perform one or more corrective actions in response to detecting the collision, such as coming to a safe stop and/or executing an alternate trajectory.

A robot can perform a sequence of actions while performing a task. An action, when applied to the cascading VAE network, is a representation of a robot action that causes the robot to transition from the first state to the second state. For example, the action can indicate direction, velocity, acceleration, and/or other movement parameters of one or more components of the robot. For instance, the action can indicate, in a task space, a direction of movement of an end-effector of the robot. Performing the sequence of actions causes the robot to transition to a sequence of different states. A robot state, when processed using the cascading VAE, is a representation of the position and/or orientation of the robot. For example, the robot state can indicate the position and/or orientation of each joint of the robot, each end-effector of the robot, each motor of the robot, and/or other component(s) of the robot. Additionally or alternatively, the robot state can indicate a variety of other robot measurement(s) such as motor current of one or more motors of the robot, joint torque of one or more joints of the robot, acceleration of one or more components of the robot, etc. For instance, a state can indicate the current position of a robot arm. For example, a robot transitions from its current state (i.e., the current state of the robot) to a subsequent robot state based on performing one or more actions of the sequence. There is a strong causal relationship between the robot states. Implementations disclosed herein use cascading VAE networks to determine whether there is a collision at any of the robot states. Cascading VAE networks include a sequence of VAEs as well as a predictor network, where each VAE can be used to process a corresponding robot state while the robot is performing the task. For example, the first VAE is used to process the first robot state, the second VAE is used to process the second robot state, etc. Each VAE includes an encoder portion and a decoder portion. The encoder portion is trained to generate a latent space for the current robot state. In some implementations, the latent space of the VAE is continuous, which can allow for random sampling and interpolation of the latent space. For example, the encoder can generate a continuous latent space that is a Gaussian distribution, where the mean and the standard deviation of the Gaussian distribution are determined using the encoder. The VAE is trained such that processing the same input robot state using the encoder portion will generate the same latent space. The decoder portion of the VAE can process a sampling of the latent space to generate a reconstruction of the input robot state. Because the latent space is continuous, the system can generate many different samplings of the same latent space. Thus, the decoder portion is not always processing the same sampling when generating the reconstruction of the input robot state.

The cascading VAE can include a shared predictor network. The shared predictor network can be used to generate a predicted next latent space by processing, using the shared predictor network: (1) a latent space generated based on a current robot state at a current iteration and (2) the action to transition from the current robot state to the next robot state. In some implementations, the cascading VAE can be trained using collision-free training instances (while not training the cascading VAE using training instances where there is a robot collision). Since the cascading VAE was trained using collision-free training instances, the predicted latent space of the next state is a representation of what the system expects the latent space of the next state to be if there is no collision while performing the action to transition from the current state to the next state. Put another way, the predicted latent space of the next state is an expected latent space that is conditioned on the current state and the action to be implemented, assuming no collision. A collision can be determined based on the predicted next latent space as well as the latent space generated by processing the next robot state using the next VAE. Put another way, the system can compare (1) the predicted latent space indicating the expected latent state without a collision with (2) the latent space of the next state. The comparison in the predicted latent space and the latent space of the next state provides an indication of whether a collision occurred.

In some implementations, the predicted next latent space and the latent space of the next state can be compared directly to determine whether there is a collision. For example, a KL divergence measure can be determined based on the predicted next latent space and the next latent space, and a collision can be determined to have occurred when the KL divergence measure satisfies one or more conditions, such as the KL divergence measure exceeding a threshold value.

Additionally or alternatively, a sampling of the predicted next latent space can be processed using the decoder portion of the next VAE to generate a predicted reconstruction of the next robot state. Similarly, a sampling of the next latent space can be processed using the decoder portion of the next VAE to generate a reconstruction of the next robot state. A collision can be determined based on the predicted reconstruction of the next robot state and the reconstruction of the next robot state. Differences between the predicted reconstruction of the next state (i.e., the reconstruction of the next state the system expects if there is not a collision) and the reconstruction of the next state can indicate whether there is a collision. For example, a mean squared error measure can be determined based on the predicted reconstruction of the next robot state and the reconstruction of the next robot state, and a collision can be determined to have occurred when the mean squared error measure satisfies one or more conditions, such as exceeding a threshold value. Additionally or alternatively, a collision can be determined based on a combination of (1) the difference between the predicted next latent space and the next latent space and (2) the difference between the predicted reconstruction of the next robot state and the reconstruction of the next robot state. For example, a KL divergence measure can be determined based on the predicted next latent space and the next latent space, a mean squared error measure can be determined based on the predicted reconstruction of the next robot state and the reconstruction of the next robot state, and a collision can be determined when the KL divergence measure satisfies one or more first conditions and/or when the mean squared error measure satisfies one or more second conditions.

For example, a robot can perform a grasping task which includes a sequence of actions: action 1 and action 2, where the robot is initially in robot state 1, the robot transitions from robot state 1 to robot state 2 based on action 1, and the robot transitions from robot state 2 to robot state 3 based on action 2. In the illustrated example, a cascading VAE network can be used to determine whether there is a collision at robot state 2 or robot state 3, where the cascading VAE network includes a predictor network and at least a first VAE, a second VAE, and a third VAE. The first VAE can process robot state 1, the second VAE can process robot state 2, and the third VAE can process robot state 3. Additionally or alternatively, in some implementations, each VAE can process the sequence of robot states or a subset of the sequence of robot states. For example, the second VAE can process the sequence of robot state 1 and robot state 2; the third VAE can process the sequence of robot state 1, robot state 2, and robot state 3; and/or the third VAE can process the sequence of robot state 2 and robot state 3.

The predictor network can generate a predicted second latent state by processing the first latent state and action 1, where the first latent space is generated by processing robot state 1 using an encoder portion of the first VAE. In some implementations, a collision can be determined based on comparison of the predicted second latent space and the second latent space generated by processing robot state 2 using an encoder portion of the second VAE. For example, a KL divergence measure can be determined based on the predicted second latent space and the second latent space. A collision can be determined to have occurred when the KL divergence measure satisfies one or more conditions, such as when the KL divergence measure exceeds a threshold value. Additionally or alternatively, the decoder of the second VAE can process a sampling of the predicted second latent space to generate a predicted reconstruction of robot state 2. The decoder of the second VAE can also be used to process a sampling of the second latent space to generate a reconstruction of robot state 2. In some implementations, whether a collision can be determined based on a difference between the predicted reconstruction of robot state 2 and the reconstruction of robot state 2, such as a mean squared error measure. Furthermore, in some implementations, a collision can be determined to have occurred based on (1) the difference between the predicted second latent space and the second latent space and (2) the difference between the predicted reconstruction of robot state 2 and the reconstruction of robot state 2.

Additionally or alternatively, the predictor network can generate a predicted third latent space based on the second latent space generated using the encoder portion of the second VAE along with action 2, which transitions the robot from robot state 2 to robot state 3. In some implementations, the predictor network is common to all VAEs in the cascading VAE network. An encoder portion of the third VAE can generate a third latent space based on robot state 3, and a decoder portion of the third VAE can process a sampling of the third latent space to generate a reconstruction of robot state 3. As described above with respect to robot state 2, whether a collision occurred can be determined based on a difference between the predicted third latent space and the third latent space and/or based on a difference between a predicted reconstruction of robot state 3 (generated by processing a sampling of the predicted latent space using the decoder portion of the third VAE) and the reconstruction of robot state 3.

Accordingly, various implementations set forth techniques for detecting robot collision using a cascading VAE model. Detecting a collision while a robot is performing a task can enable a robot to perform corrective action(s) in response to detecting the collision. For example, detection of a collision can cause the robot to come to a safe stop. This can protect components of the robot (e.g., motors, end effectors, batteries, electrical components, etc.) from damaged caused by the robot continuing to perform the task after the collision. In contrast, for example, one or more motors of the robot could be damaged if the robot continues performing the task despite the collision. This can additionally or alternatively protect environmental object(s) with which the robot collided. Additionally or alternatively, detecting the collision can cause the robot to execute an alternate trajectory to continue performing the task and/or to mitigate adverse consequences of the collision (e.g., mitigate damage to the robot and/or environmental objects).

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
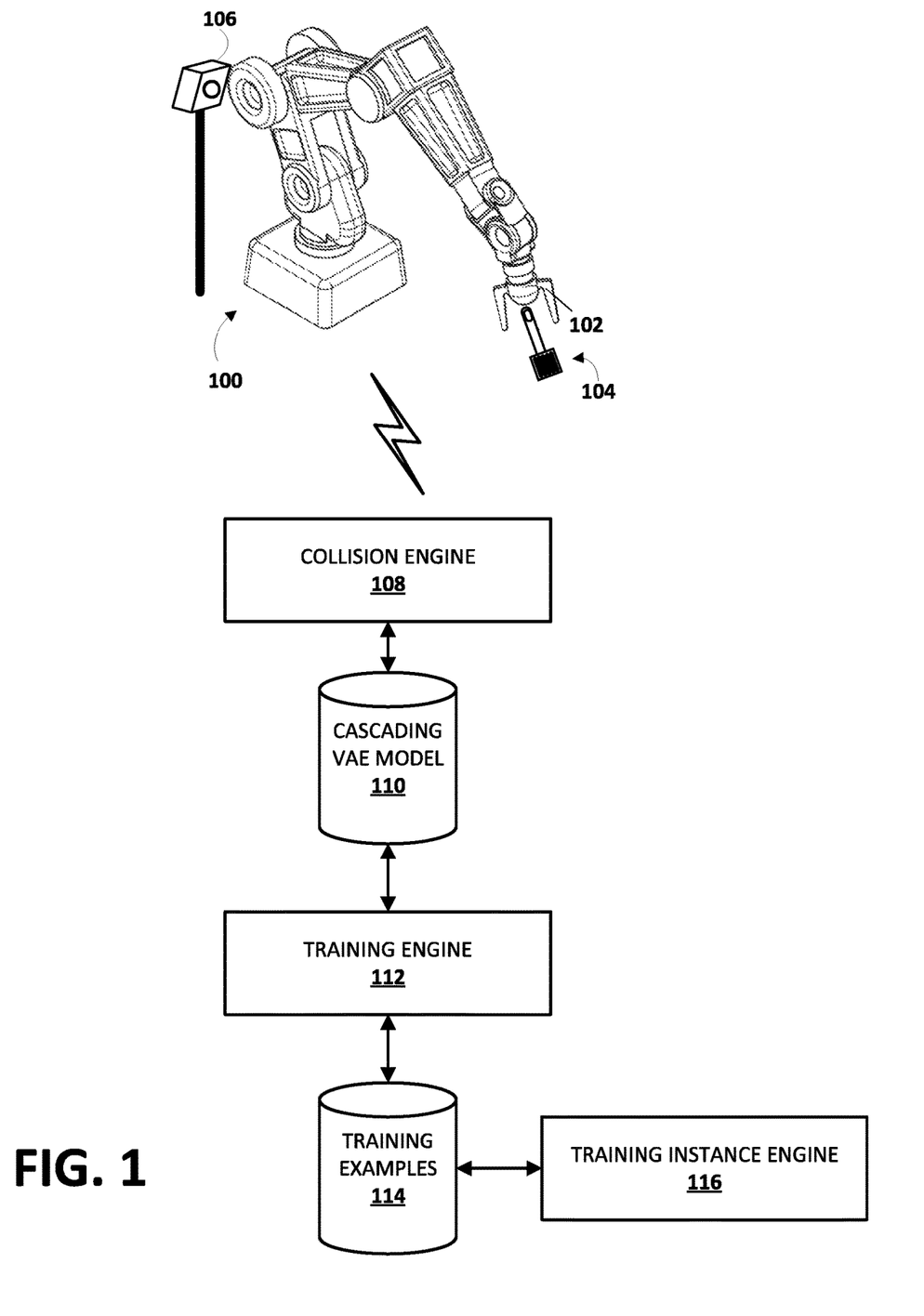
FIG. 1 illustrates an example environment in which a robot can perform a task in accordance with implementations disclosed herein.

Turning now to the figures, example robot 100 is illustrated in FIG. 1. Robot 100 is a "robot arm" having multiple degrees of freedom to enable traversal of grasping end effector 102 along any of a plurality of potential paths to position the grasping end effector 102 in desired locations. Robot 100 further controls the two opposed "claws" of their grasping end effector 102 to actuate the claws between at least an open position and a closed position (and/or optionally a plurality of "partially closed" positions).

Example vision sensor 106 is also illustrated in FIG. 1. Vision sensor 106 is mounted at a fixed pose relative to the base or other stationary reference point of robot 100. Vision sensor 106 is a sensor that can generate images related to shape, color, depth, and/or other features of object(s) that are in the line of sight of the sensor. The vision sensor 106 may be, for example, monographic cameras, stereographic cameras, and/or 3D laser scanners. A 3D laser scanner may be, for example, a time-of-flight 3D laser scanner or a triangulation based 3D laser scanner and may include a position sensitive detector or other optical position sensor. The vision sensor 106 has a field of view of at least a portion of the workspace of the robot 100, such as the portion of the workspace that includes example object 104. Although resting surface(s) for object(s) are not illustrated in FIG. 1, those objects may rest on a table, a tray, and/or other surface(s). Objects may include a spatula, a stapler, and a pencil. In other implementations, more objects, fewer objects, additional objects, and/or alternative objects may be provided during all or portions of grasping attempts of robot 100 as described herein.

Although a particular robot 100 is illustrated in FIG. 1, additional and/or alternative robots may be utilized, including additional robot arms that are similar to robot 100, robots having other robot arm forms, robots having a humanoid form, robots having an animal for, robots that move via one or more wheels (e.g., self-balancing robots), submersible vehicle robots, an unmanned aerial vehicle ("UAV"), and so forth. Also, although particular grasping end effectors are illustrated in FIG. 1, additional and/or alternative end effectors may be utilized, such as alternative impactive grasping end effectors (e.g., those with grasping "plates", those with more or fewer "digits"/"claws"), ingressive grasping end effectors, astrictive grasping end effectors, contigutive grasping end effectors, or non-grasping end effectors. Additionally, although a particular mounting of vision sensor 106 is illustrated in FIG. 1, additional and/or alternative mountings may be utilized. For example, in some implementations, vision sensors may be mounted directly to robots, such as on non-actuable components of the robot or on actuable components of the robot (e.g., on the end effector or a component close to the end effector). Also, for example, in some implementations, a vision sensor may be mounted on a non-stationary structure that is separate from its associated robot and/or may be mounted in a non-stationary manner on a structure that is separate from its associated robot.

Collision engine 108 can determine whether robot 100 has collided with the environment. In some implementations, collision engine 108 can be determine whether there is a collision using cascading VAE model 110. For example, collision engine 108 can process a current state of the robot, a next state of the robot, and an action to transition the robot from the current state to the next state using cascading VAE model 110 to determine a latent space for the next state and a predicted latent space for the next state as described herein. In some implementations, collision engine 108 can determine whether there is a collision in accordance with process 600 of FIG. 6. Cascading VAE model 110 can be trained using training engine 112 based on training examples 114. In some implementations, cascading VAE model 110 can be trained in accordance with process 400 of FIG. 4 and/or process 500 of FIG. 5. Additionally or alternatively, training examples 114 can be generated using training instance engine 116. In some implementations, training instance engine 116 can generate training examples 114 in accordance with process 300 of FIG. 3.

In some implementations, cascading VAE model 110 can be trained using collision free training examples 114. Training using only collision free training data can train cascading VAE 110 to generate predictions about the next state of the robot at the next iteration, where the next state is the state that is expected if there is no collision. For example, cascading VAE 110 can be used to generate a predicted latent space for the next state, where the predicted latent space for the next state is the expected latent space for the next state if there is no collision. Collision engine 108 can compare the predicted latent space for the next state with the latent space for the next state to determine whether there is a collision. In other words, collision engine 108 can determine whether there is a collision based on the expected latent space for the next state if there is no collision at the next state with the actual latent space for the next state. When the predicted latent space for the next state is very different from the actual latent space for the next state (e.g., difference measure(s) satisfy threshold(s)), collision engine 108 can determine a collision has occurred (i.e., a collision has occurred when the actual latent space for the next state is very different from the expected latent space of the next state). Similarly, when the predicted latent space for the next state is similar to the actual latent space for the next state, collision engine 108 can determine no collision has occurred.

Figure 2:
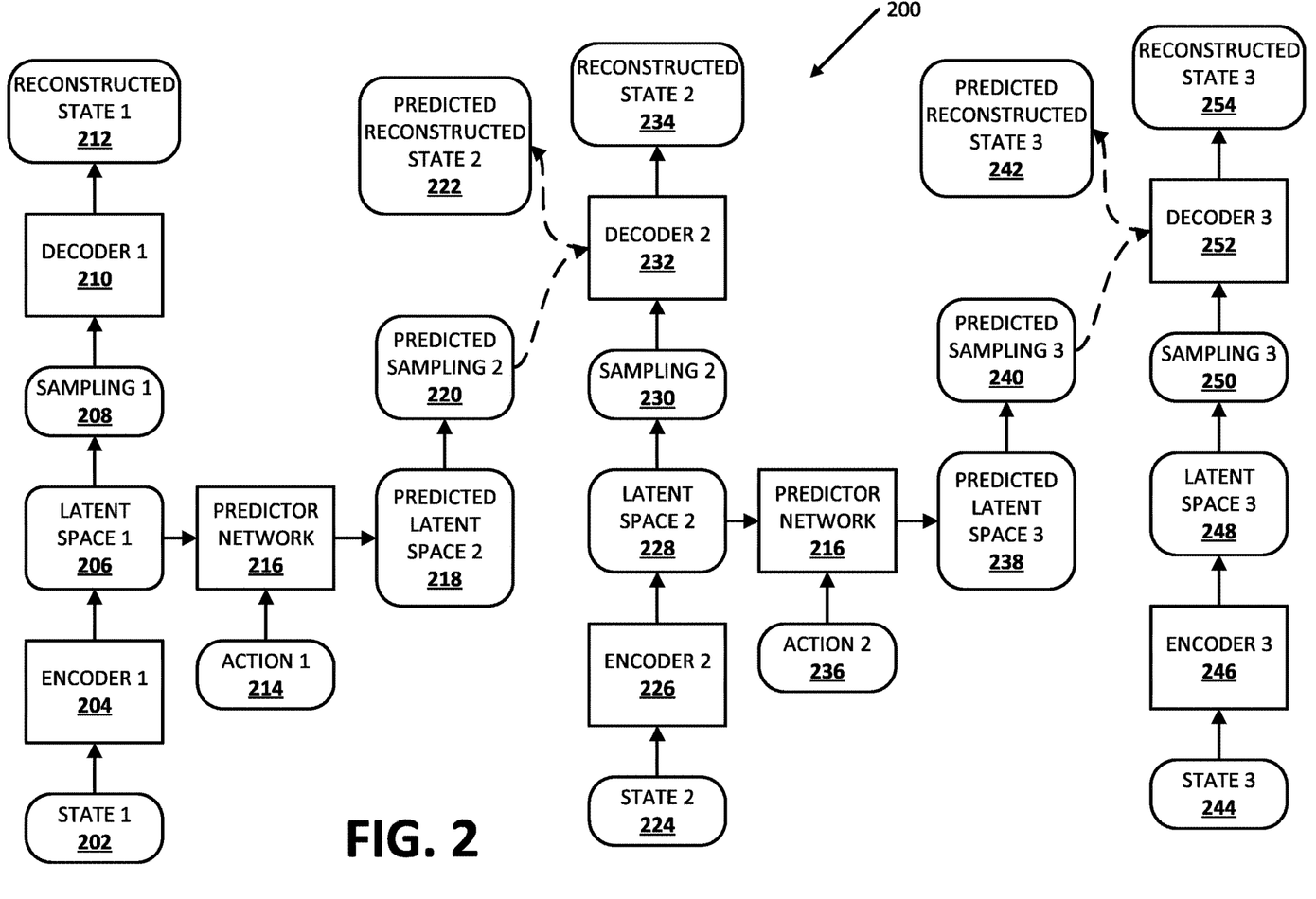
FIG. 2 illustrates a cascading variational autoencoder which can be utilized to determine robot collisions in accordance with implementations disclosed herein.

FIG. 2 illustrates an example cascading VAE 200 in accordance with implementations disclosed herein. Cascading VAE 200 includes three sequential VAEs and a predictor network 216. The sequence of three VAEs is merely an example, and the cascading VAE can include additional and/or alternative numbers of VAEs. For example, the cascading VAE can include a sequence of two VAEs, four VAEs, 5 VAEs, 10 VAEs, 20 VAEs, and/or other quantity of VAEs. In some implementations, predictor network 216 is shared among all VAEs in the cascading VAE. In some other implementations, the cascading VAE can include multiple predictor networks (not illustrated) in lieu of the shared predictor network 216 illustrated in FIG. 2.

The first VAE in the cascading VAE 200 includes an encoder portion, encoder 1 204, and a decoder portion, decoder 1 210. An initial state of the robot, state 1 202, can be processed using encoder 1 204 to generate a latent space of the first VAE, latent space 1 206. In some implementations, latent spaces generated using cascading VAE 200 can be any one of a variety of continuous distributions such as a normal distribution latent space, a uniform distribution latent space, a Cauchy distribution latent space, a Laplace distribution latent space, a chi-squared distribution latent space, a Rayleigh distribution latent space, and/or additional distribution(s) latent spaces. For example, encoder 1 204 can process state 1 202 to generate latent space 1 206, where latent space 1 206 is a normal distribution. Latent space 1 206 can be sampled to generate a sampling of latent space 1, sampling 1 208. Sampling 1 208 can be processed using decoder 1 210 to generate a reconstruction of the initial state, reconstructed state 1 212.

The second VAE in cascading VAE 200 includes an encoder portion, encoder 2 226, and a decoder portion, decoder 2 232. Encoder 2 226 can process the second state of the robot, state 2 224, using encoder 2 226 to generate a latent space of the second state, latent space 2 228. As described above, latent space 2 228 can include a variety of continuous distributions, such as a normal distribution latent space. In some implementations, encoder 2 226 processes only the second state in the robot state sequence. In some other implementations, encoder 2 226 can process a sequence of robot states which includes the second state. For example, encoder 2 226 can process the sequence of state 1 202 and state 2 224. Robot states typically have a strong causal relationship between data in adjoining time steps. Processing a preceding state(s) in addition to a current state at an individual VAE in the cascading VAE can capture this causal relationship between robot states when determining whether there is a collision.

A sample of the second latent space, sampling 2 230 can be processed using decoder 2 232 to generate a reconstruction of the second state, reconstructed state 2 234. In some implementations, a prediction of the second latent space, predicted latent space 2 218 can be used in determining whether there is a robotic collision at state 2 224. Predictor network 216 can process latent space 1 206 along with action 1 214 to generate a prediction of the second latent space, predicted latent space 2 218, where action 1 transitions the robot from state 1 202 to state 2 224. In some implementations, a system can determine whether there is a collision by comparing latent space 2 228 with predicted latent space 2 218. For example, the system can determine a divergence measure based on latent space 2 228 and predicted latent space 2 218, such as a Kullback-Leibler ("KL") divergence measure, and/or additional difference measure(s). The system can determine a collision when the divergence measure satisfies a threshold value. For example, the system can determine a collision when the KL divergence measure exceeds a threshold value. Additionally or alternatively, a sample of the predicted second latent space, predicted sampling 2 220, can be processed using decoder 2 232 to generate a predicted reconstruction of the second state, predicted reconstructed state 2 222. In some of those implementations, the system can determine whether there is a collision based on reconstructed state 2 234 and predicted reconstructed state 2 222. For example, the system can determine a divergence measure based on reconstructed state 2 234 and predicted reconstructed state 2 222, such as a mean squared error measure, and/or an additional divergence measure(s). The system can determine there is a collision when the divergence measure based on the reconstructed state and the predicted reconstructed state satisfy a threshold value. For example, the system can determine a mean squared error measure based on the difference between predicted reconstructed state 2 222 and reconstructed state 2 234. The system can determine a collision when the mean squared error measure satisfies a threshold value, such as when the mean squared error measure exceeds a threshold. In some additional or alternative of those implementations, the system can determine whether there is a collision based on a difference between predicted latent space 2 218 and latent space 228, as well as the difference between reconstructed state 2 234 and predicted reconstructed state 2 222.

The third VAE in cascading VAE 200 includes an encoder portion, encoder 3 246, and a decoder portion, decoder 3 252. A third robot state, state 3 224, can be processed using encoder 3 246 to generate a latent space of the third state, latent space 3 248. As described above, latent space 3 248 can be any of a variety of continuous distributions. Also as described above, encoder 3 246 can process additional state(s) in the state sequence in addition to state 3 244 to capture the causal relationship between the robotic states. For example, encoder 3 246 can process the entire state sequence (i.e., state 1, state 2, state 3) in generating latent space 3 248, or encoder 3 246 can process a subset of the state sequence (i.e., state 2, state 3) in generating latent space 3 248. A sample of the third latent space, sampling 3 250, can be processed using decoder 3 252 to generate a reconstruction of the third state, reconstructed state 3 254.

A prediction of the third latent space, predicted latent space 3 238 can be generated by processing latent space 2 228 and action 2 236 using predictor network 216, where action 2 236 transitions the robot from state 2 224 to state 3 244. As described above, in some implementations, the system can determine whether there is a collision based on predicted latent space 3 238 and latent space 3 248. For example, the system can determine a divergence measure, such as a KL divergence measure, between predicted latent space 3 238 and latent space 3 244. The system can determine there is a collision when the divergence measure satisfies a threshold value, such as when a KL divergence measure exceeds a threshold value. In some other implementations, the system can generate a sample of the predicted third latent space, predicted sampling 3 240. Predicted sampling 3 240 can be processed using decoder 3 252 to generate a predicted reconstruction of the third state, predicted reconstructed state 3 242. In some of those implementations, the system can determine whether there is a collision based on a difference between reconstructed state 3 254 and predicted reconstructed state 3 242. For example, the system can determine a difference measure between reconstructed state 3 254 and predicted reconstructed state 3 242. For example, the system can determine a mean squared error measure based on the difference between reconstructed state 3 254 and predicted reconstructed state 3 242. The system can determine a collision when the difference measure satisfies a threshold value. For example, the system can determine a collision when the mean squared error measure exceeds a threshold value. In some other implementations, the system can determine whether there is a collision based on the difference between predicted latent space 3 238 and latent space 3 248 and based on the difference between reconstructed state 3 254 and predicted reconstructed state 3 242. For example, the system can determine a collision based on whether a divergence measure of the predicted latent space and the latent space satisfies a first threshold value (e.g., a KL divergence measure exceeds a first threshold value) and/or based on whether a difference measure based on the difference between the reconstructed state and the predicted reconstructed state satisfies a second threshold value (e.g., a mean squared error measure exceeds a second threshold value).

Figure 3:
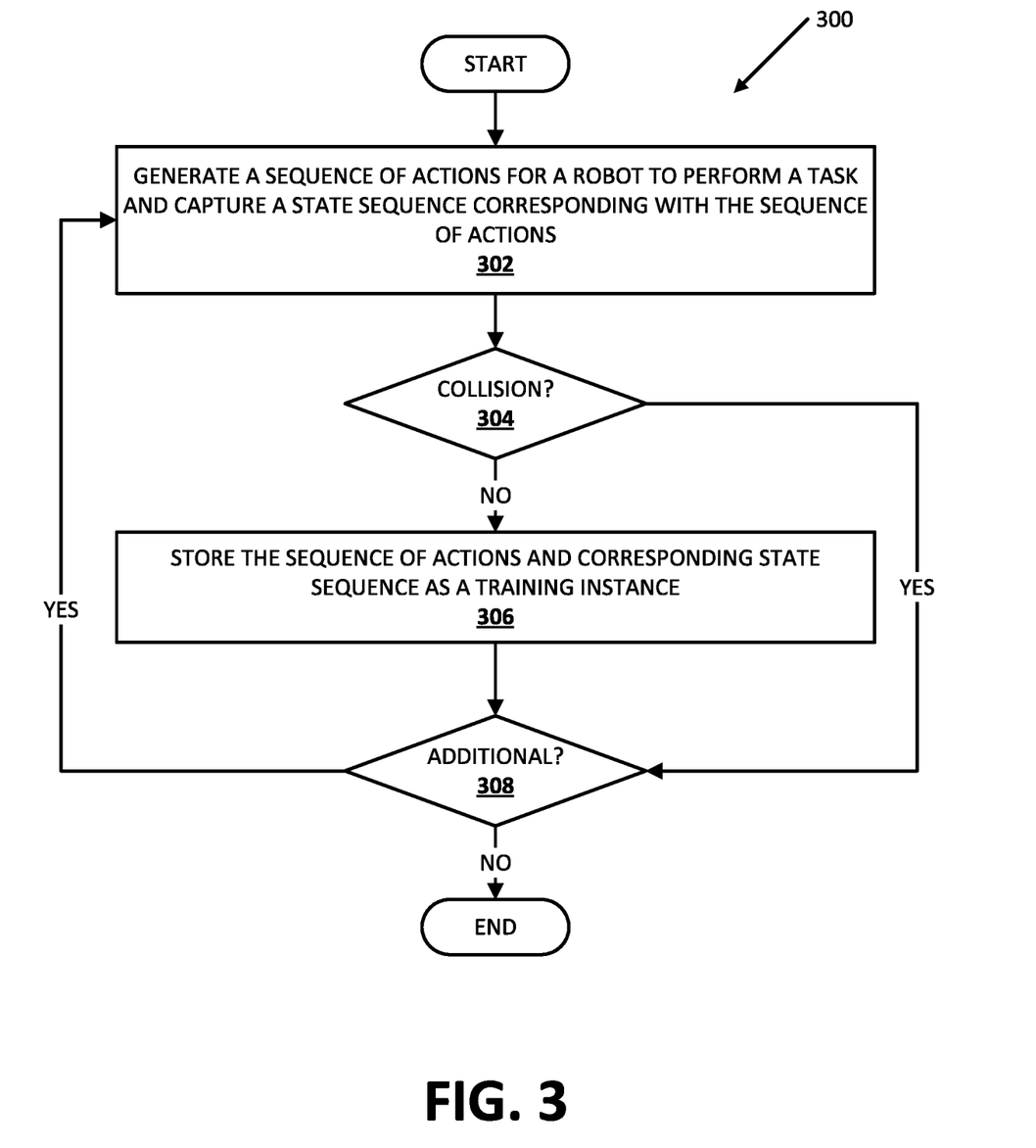
FIG. 3 is a flowchart illustrating an example process of generating training instances for use in training a cascading variational autoencoder in accordance with implementations disclosed herein.

FIG. 3 is a flowchart illustrating an example process 300 of generating training instances for training a cascading VAE in accordance with implementations described herein. For convenience, the operations of the flowchart are described with reference to a system that performs the operations. This system may include one or more components of a computing device and/or a robot, such as a processor and/or robot control system of robot 100 of FIG. 1, robot 725 of FIG. 7, and/or other robot(s). Moreover, while operations of process 300 are shown in a particular order, this is not meant to be limiting. One or more operations may be reordered, omitted, and/or added.

At block 302, the system generates a sequence of actions for a robot to perform a task and captures a state sequence corresponding with the sequence of actions. In some implementations, the system captures the state sequence and corresponding actions generated while a real robot is performing the task. In some other implementations, the system generates the state sequence and corresponding actions of the robot performing the task in simulation.

At block 304, the system determines whether there is a collision when the robot is performing the task in the generated state sequence with corresponding actions. In some implementations, the determination can be unsupervised (i.e., another system determines whether there is a collision), supervised (i.e., a human reviewer determines whether there is a collision), and/or semi-supervised (i.e., another system determines whether there is a collision, and the determination is confirmed by a human reviewer). If the system determines at block 304 there is no collision, the system proceeds to block 306. If the system determines there is a collision, the system proceeds to block 308.

At block 306, the system stores the sequence of actions and corresponding state sequence as a training instance. After storing the training instance, the system proceeds to block 308.

At block 308, the system determines whether to generate additional training instance(s). In some implementations, the system continues generating additional training instances until an entire collision free data set of the robot has been captured. Additionally or alternatively, the system can continue generating additional training instances until a threshold value of training instances has been satisfied (e.g., the system generates a threshold quantity of training instances). If the system determines to generate one or more additional training instances, the system proceeds back to block 302, generates an additional sequence of actions and captures a state sequence corresponding to the additional sequence of actions, proceeds to blocks 304 and 306 based on the additional sequence of actions and corresponding state sequence, before proceeding back to block 308. If at block 308 the system determines to not generate additional training instances, the process ends.

Figure 4:
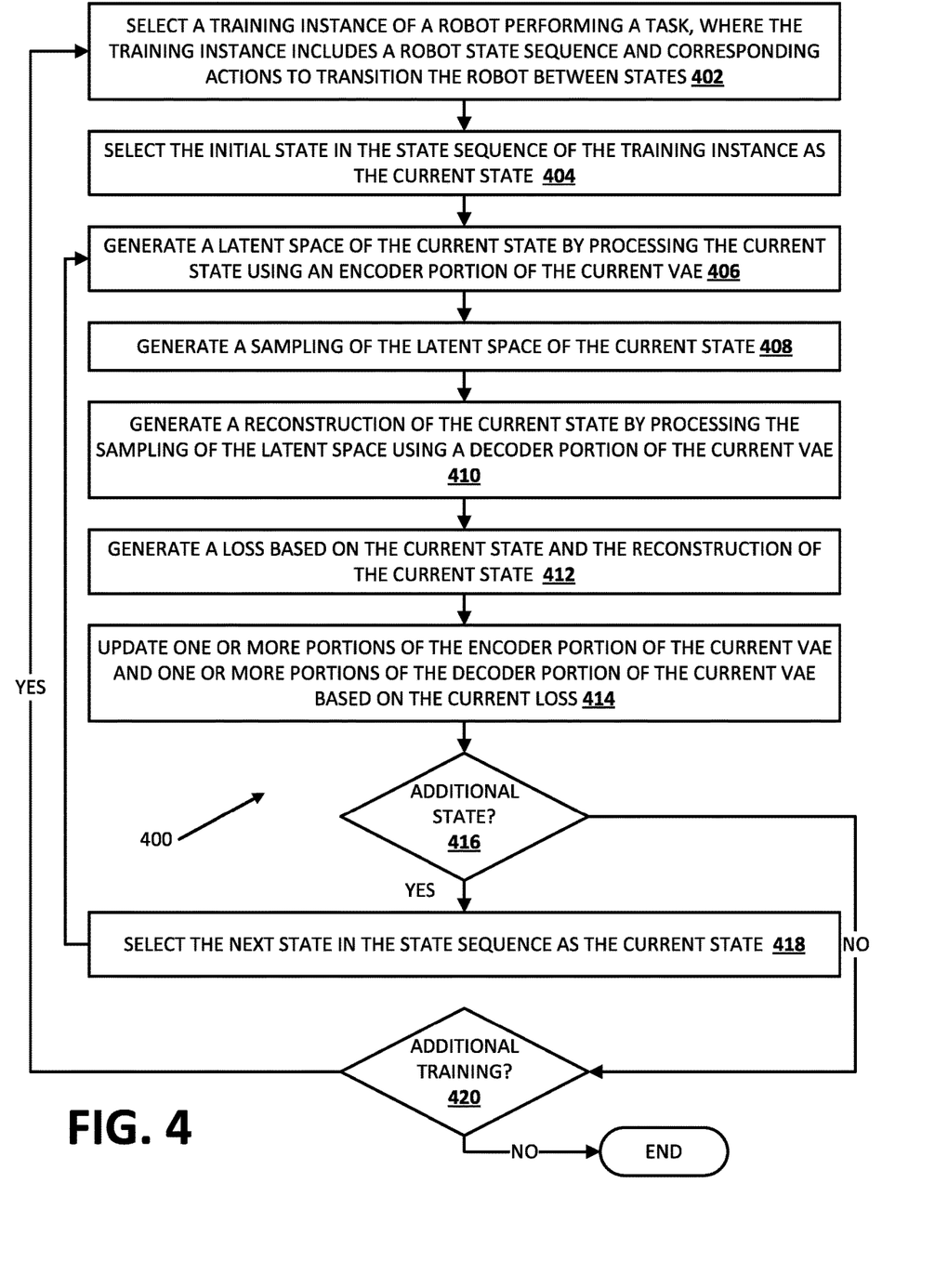
FIG. 4 is a flowchart illustrating an example process of training variational autoencoders in a cascading variational autoencoder in accordance with implementations disclosed herein.

FIG. 4 is a flowchart illustrating an example process 400 of training VAEs of a cascading VAE network in accordance with implementations described herein. For convenience, the operations of the flowchart are described with reference to a system that performs the operations. This system may include one or more components of a computing device and/or a robot, such as a processor and/or robot control system of robot 100 of FIG. 1, robot 725 of FIG. 7, and/or other robot(s). Moreover, while operations of process 400 are shown in a particular order, this is not meant to be limiting. One or more operations may be reordered, omitted, and/or added.

At block 402, the system selects a training instance of a robot performing a task, where the training instance includes a robot state sequence and corresponding actions to transition between the robot states in performance of the task. In some implementations, the training instance is collision free (i.e., there is no collision while the robot is performing the task in the training instance). In some implementations, the training instance is generated in accordance with process 300 of FIG. 3.

At block 404, the system selects the initial state in the state sequence of the training instance as the current state.

At block 406, the system generates a latent space of the current state by processing the current state using an encoder portion of a VAE corresponding to the current state. In some implementations, the generated latent space is a continuous distribution such as, for example, a normal distribution. For example, the system can generate a latent space for the initial state of the robot by processing the initial state in the state sequence of the training instance using the encoder portion of a first VAE. Similarly, the system can generate a latent space for the Nth state of the robot by processing the Nth robot state in the state sequence of the training instance using the encoder portion of a Nth VAE. In some implementations, the system can process one or more preceding states in the state sequence in addition to the current state using the encoder portion of the VAE corresponding to the current state to generate the latent space of the current state. Processing a sequence of states using an encoder portion of the current VAE may capture the causal relationship between robot states in adjoining time steps. As an example, when training a VAE corresponding to a sixth robot state in a state sequence, the system can process one or more preceding states using the encoder in addition to the sixth state. For example, the system can process, using the corresponding encoder, the sixth state; a sequence of the fifth state and the sixth state; a sequence of the fourth state, the fifth state, and the sixth state; a sequence of the third state, the fourth state, the fifth state, and the sixth state; a sequence of the second state, the third state, the fourth state, the fifth state, and the sixth state; as well as the entire state sequence of the first state, the second state, the third state, the fourth state, the fifth state, and the sixth state.

At block 408, the system generates a sampling of the latent space of the current state 408.

At block 410, the system generates a reconstruction of the current state by processing the sampling of the latent space using a decoder portion of the VAE corresponding to the current state.

At block 412, the system generates a loss based on the current state and the generated reconstruction of the current state. For example, the system can compare the current state and the generated reconstruction of the state, and generate a loss that corresponds to a magnitude of the difference of the current state and the generated reconstruction of the state.

At block 414, the system updates one or more portions of the encoder portion of the VAE of the current state and/or one or more portions of the decoder portion of the VAE of the current state based on the generated loss. For example, the system can update portion(s) of the encoder and/or portion(s) of the decoder based on the loss using backpropagation.

At block 416, the system determines whether there are any unprocessed states in the state sequence of the selected training instance. If so, the system proceeds to block 418. If not, the system proceeds to block 410.

At block 418, in response to determining there are one or more unprocessed states in the state sequence portion of the selected training instance, the system selects the next state in the sequence as the current state, and proceeds back to blocks 406, 408, 410, 412, and 416 based on the next state as the current state. In other words, the system trains next VAE in the cascading VAE network based on the next state.

At block 420, the system determines whether to perform additional training of VAEs in the cascading VAE network. If so, the system proceeds back to block 402, selects an additional training instance, proceeds to blocks 404, 406, 408, 410, 412, 414, and 416 based on the additional training instance, before performing an additional iteration of block 420. The other criterion/criteria can include, for example, whether a threshold number of epochs have occurred and/or a threshold duration of training has occurred. Although process 400 is described with respect to a non-batch learning technique, batch learning may additionally and/or alternatively be utilized. If, at block 420, the system determines to not perform additional training, the process ends.

Figure 5:
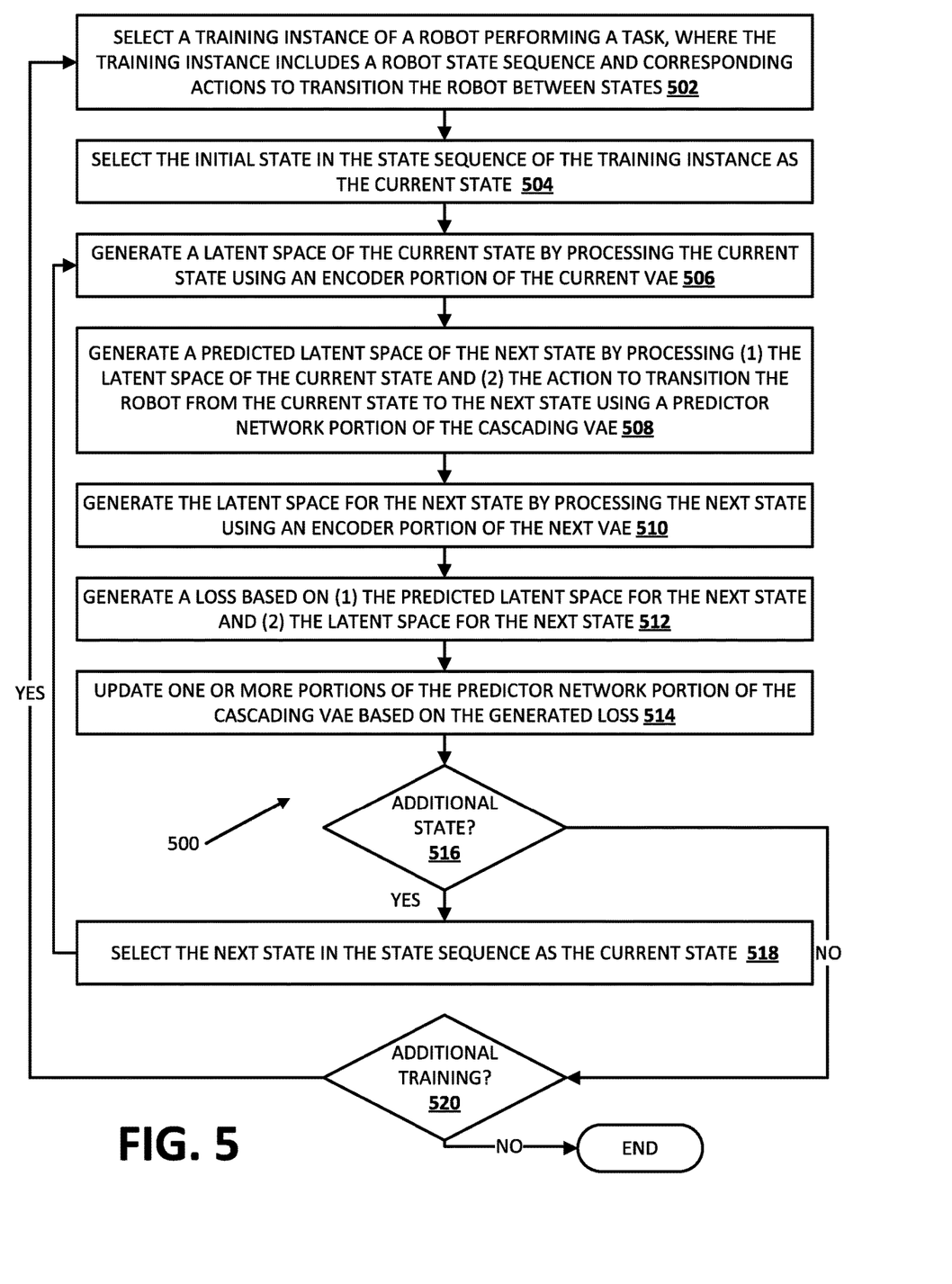
FIG. 5 is a flowchart illustrating an example process of training a predictor network portion of a cascading variational autoencoder in accordance with implementations disclosed herein.

FIG. 5 is a flowchart illustrating an example process 500 of training a predictor network portion of a cascading VAE network in accordance with implementations described herein. For convenience, the operations of the flowchart are described with reference to a system that performs the operations. This system may include one or more components of a robot, such as a processor and/or robot control system of robot 100 of FIG. 1, robot 725 of FIG. 7, and/or other robot(s). Moreover, while operations of process 500 are shown in a particular order, this is not meant to be limiting. One or more operations may be reordered, omitted, and/or added.

At block 502, the system selects a training instance of a robot performing a task, where the training instance includes a robot state sequence and corresponding actions to transition the robot between states while the robot is performing the task. In some implementations, the training instance is collision free (i.e., there is no collision while the robot is performing the task in the training instance). In some implementations, the training instance is generated in accordance with process 300 of FIG. 3.

At block 504, the system selects the initial state in the state sequence of the training instance as the current state.

At block 506, the system generates a latent space of the current state by processing the current state using an encoder portion of a VAE corresponding to the current state.

At block 508, the system generates a predicted latent space for the next state by processing (1) the latent space of the current state and (2) the action to transition the robot from the current state to the next state (i.e., the corresponding action portion of the training instance) using a predictor network portion of the cascading VAE.

At block 510, the system generates a latent space for the next state by processing the next state using an encoder portion of the VAE corresponding to the next state. For example, when the system generates a latent space of a third state at block 506, the system can generate a predicted next latent space of the fourth state at block 508, and a latent space of the fourth state at block 510.

At block 512, the system generates a loss based on (1) the predicted latent space for the next state (i.e., the predicted latent space generated at block 508) and (2) the latent space for the next state (i.e., the latent space generated at block 510). For example, the system can compare the predicted latent space for the next state and the latent space for the next state, and generate a loss that corresponds to a magnitude of the difference of the predicted latent space for the next state and the latent space for the next state.

At block 514, the system updates one or more portions of the predictor network portion of the cascading VAE based on the generated loss (e.g., the system updates portion(s) of the predictor network based on the loss using backpropagation).

At block 516, the system determines whether there are additional unprocessed state(s) in the state sequence of the selected training instances. If the system determines there are additional unprocessed state(s) in the state sequence of the selected training instance, the system proceeds to block 518. If the system determines there are no additional states in the state sequence of the selected training instance, the system proceeds to block 520.

At block 518, the system selects the next state in the state sequence as the current state and proceeds back to blocks 506, 508, 510, 512, 514, and 516 based on the next state in the state sequence. While process 500 is described with generating the latent space of the next state at block 506, in some implementations, the system reuses the latent space for the next state generated at block 510 from the previous iteration.

At block 520, the system determines whether to perform any additional training on the predictor network portion of the cascading VAE. If so, the system proceeds back to block 502, selects an additional training instances, proceeds to blocks 504, 506, 508, 510, 512, 514, 516, and 518 based on the additional training instance, before performing an additional iteration of block 520. In some implementations, the system can determine to perform more training if there are one or more additional unprocessed training instances and/or if other criterion/criteria are not yet satisfied. The other criterion/criteria can include, for example, whether a threshold number of epochs have occurred and/or a threshold duration of training has occurred. Although process 500 is described with respect to a non-batch learning technique, batch learning may additionally and/or alternatively be utilized. If, at block 520, the system determines to not perform additional training, the process ends.

While process 400 of training VAEs of the cascading VAE and process 500 of training the predictor network are illustrated as separate processes, in some implementations the predictor network can be trained while training the VAEs. For example, a generated latent space for a current state can be used both in training the corresponding VAE (i.e., performing aspects of process 400) and in generating a predicted latent space for the next state (i.e., performing aspects of process 500).

Figure 6:
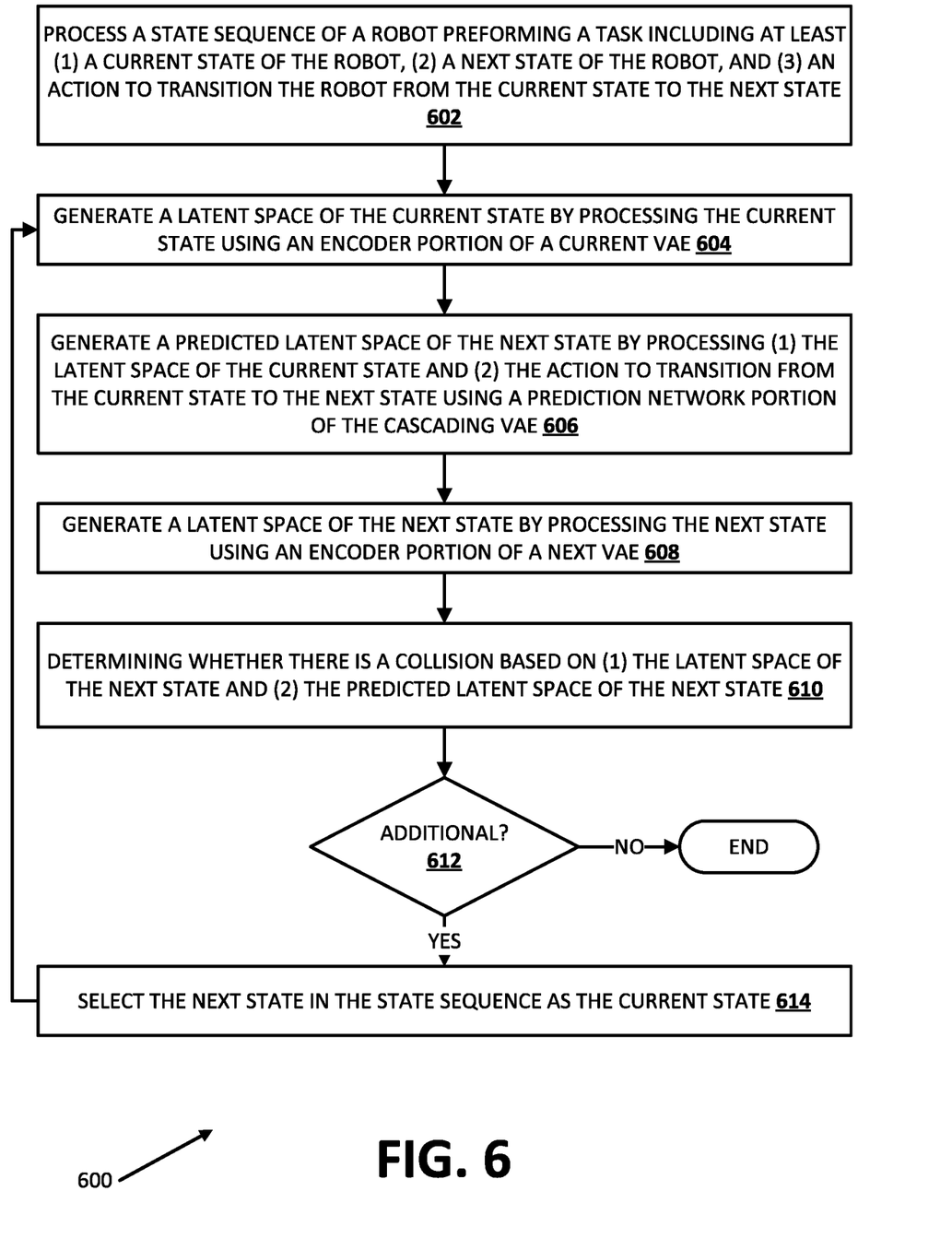
FIG. 6 is a flowchart illustrating an example process of detecting a collision using a cascading variational autoencoder in accordance with implementations disclosed herein.

FIG. 6 is a flowchart illustrating an example process 600 of determining whether there is a collision while a robot is performing a task using a cascading VAE network in accordance with implementations described herein. For convenience, the operations of the flowchart are described with reference to a system that performs the operations. This system may include one or more components of a robot, such as a processor and/or robot control system of robot 100 of FIG. 1, robot 725 of FIG. 7, and/or other robot(s). Moreover, while operations of process 600 are shown in a particular order, this is not meant to be limiting. One or more operations may be reordered, omitted, and/or added.

At block 602, the system processes a state sequence of a robot performing a task including at least (1) a current state of the robot, (2) a next state of the robot, and (3) an action to transition the robot from the current state to the next state. In some implementations, the system can determine the current state, the next state, and the action while a real robot is performing a task. In some of those implementations, the system can determine whether there is a collision based on robot action(s) in real time, thus enabling the robot to perform one or more corrective actions in response to detecting the collision, such as coming to a safe stop and/or executing an alternate trajectory. In some other implementations, the system can determine the current state, the next state, and the corresponding action based on a simulated robot performing the task.

At block 604, the system generates a latent space of the current state by processing the current state using an encoder portion of a VAE corresponding to the current state. In some implementations, the encoder portion of the VAE corresponding to the current state can be trained in accordance with process 400 of FIG. 4. In some implementations, the system processes one or more preceding states in addition to the current state using the encoder portion to generate the latent space.

At block 606, the system generates a predicted latent space of the next state by processing (1) the generated latent space of the current state and (2) the action to transition the robot from the current state to the next state using a predictor network portion of the cascading VAE. In some implementations, the predictor network is trained in accordance with process 500 of FIG. 5. In some implementations, the system begins and/or completes generation of the predicted latent space prior to the next state being reached (e.g., prior to full implementation of the action). Put another way, block 606 can be started or completed before the next state is reached.

At block 608, the system generates a latent space of the next state by processing the next state using an encoder portion of a VAE corresponding to the next state. For example, when the system processes the (N−1)th state to generate the latent space of state (N−1) at block 604, the system can generate a predicted latent space for the Nth state at block 606 and a latent space for the Nth state at block 608.

At block 610, the system determines whether there is a collision based on (1) the latent space of the next state (i.e., the latent space of the next state generated at block 608) and (2) the predicted latent space of the next state (i.e., the predicted latent space of the next state generated at block 606).

In some implementations, the system can determine whether there is a collision by determining if a divergence measure between the latent state of the next state and the predicted latent space of the next state satisfies one or more conditions. For example, the system can determine there is a collision if a KL divergence measure exceeds a threshold value. In some other implementations, the system can generate a reconstruction of the next state and a predicted reconstruction of the next state. For example, the system can process a sampling of the latent space for the next state using a decoder portion of the VAE for the next state to generate the reconstruction of the next state. Similarly, the system can process a sampling of the predicted latent space for the next state using the decoder portion of the VAE for the next state to generate the predicted reconstruction of the next state. The system can determine whether there is a collision based on whether a difference between the predicted reconstruction of the next state and the reconstruction of the next state satisfies a condition. For example, the system can determine a mean squared error measure based on the difference between the reconstructed next state and the predicted reconstructed next state. The system can determine there is a collision when the mean squared error measure exceeds a threshold value. In some other implementations, the system can determine whether there is a collision based on a divergence measure between the predicted latent space of the next state and the latent space of the next state and based on a difference measure between the predicted reconstruction of the next state and the reconstruction of the next state. For example, the system can determine whether there is a collision based on if a KL divergence measure between the predicted latent space of the next state and the latent space of the next state satisfies a first condition (e.g., the KL divergence measure exceeds a threshold value) and/or based on if a mean squared error measure between the reconstructed next state and the predicted reconstructed next state satisfies a second condition (e.g., the mean squared error measure exceeds a second threshold value).

At block 612, the system determines whether to process any additional states and corresponding actions of the robot performing the task. In some implementations, the system can determine to not process any additional states and corresponding actions if a collision is determined at block 610. In some other implementations, the system can determine to not process any additional states and corresponding actions based on the robot completing the task. If at block 612, the system determines to process additional states and corresponding actions, the system proceeds to block 614. If the system determines to not process any additional states and corresponding actions, the process ends. The process can be repeated responsive to, for example, the robot beginning another robot task.

At block 614, the system selects the next state in the state sequence as the current state with a corresponding action and proceeds back to states 604, 606, 608, 610, and 612 based on the next state. For example, if at a first iteration, the system processes a first state as the current state and a second state as the next state, the system can select the second state (i.e., the next state from the first iteration) as the current state for the second iteration. The system can then process the second state as the current state and the third state as the next state in the second iteration. While process 600 is described with generating a latent space of the current state at block 604 of each iteration, in some implementations the system can reuse the latent state of a current state generated at a previous iteration (i.e., without generating the latent space of that state again). For example, at a first iteration the system can processes a third state as the current state and a fourth state as the next state, and at the next iteration, the system can process the fourth state as the current state and a fifth state as the next state. In the illustrated example, the system can generate a latent space for the fourth state at block 608 of the first iteration (i.e., when generating the latent space for the next state). Instead of generating the latent space for the fourth state again at block 604 of the next iteration (i.e., generating the latent space for the current state of the previous iteration), the system can reuse the latent space of the fourth state generated at the previous iteration.

Figure 7:
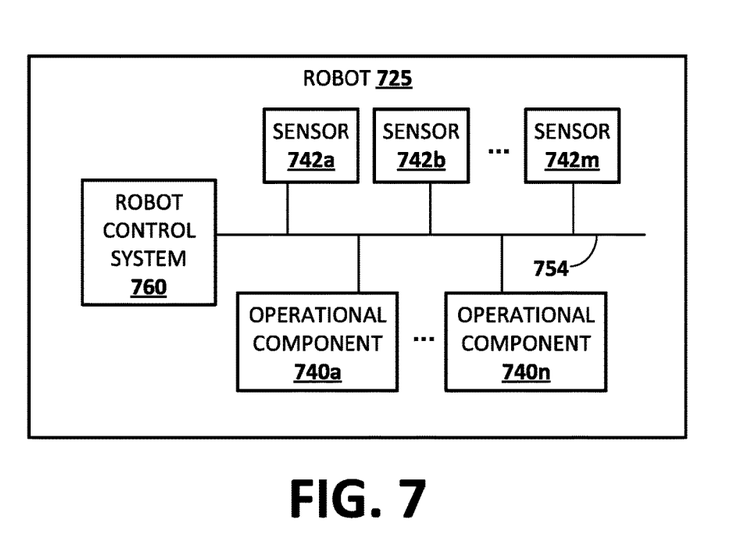
FIG. 7 schematically depicts an example architecture of a robot.

FIG. 7 schematically depicts an example architecture of a robot 725. The robot 725 includes a robot control system 760, one or more operational components 740a-740n, and one or more sensors 742a-742m. The sensors 742a-742m may include, for example, vision sensors, light sensors, pressure sensors, pressure wave sensors (e.g., microphones), proximity sensors, accelerometers, gyroscopes, thermometers, barometers, and so forth. While sensors 742a-m are depicted as being integral with robot 725, this is not meant to be limiting. In some implementations, sensors 742a-m may be located external to robot 725, e.g., as standalone units.

Operational components 740a-740n may include, for example, one or more end effectors and/or one or more servo motors or other actuators to effectuate movement of one or more components of the robot. For example, the robot 725 may have multiple degrees of freedom and each of the actuators may control actuation of the robot 725 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 760 may be implemented in one or more processors, such as a CPU, GPU, and/or other controller(s) of the robot 725. In some implementations, the robot 725 may comprise a "brain box" that may include all or aspects of the control system 760. For example, the brain box may provide real time bursts of data to the operational components 740a-n, with each of the real time bursts comprising a set of one or more control commands that dictate, inter alia, the parameters of motion (if any) for each of one or more of the operational components 740a-n. In some implementations, the robot control system 760 may perform one or more aspects of processes 300, 400, 500, and/or 600 described herein. Although control system 760 is illustrated in FIG. 7 as an integral part of the robot 725, in some implementations, all or aspects of the control system 760 may be implemented in a component that is separate from, but in communication with, robot 725. For example, all or aspects of control system 760 may be implemented on one or more computing devices that are in wired and/or wireless communication with the robot 725, such as computing device 810.

Figure 8:
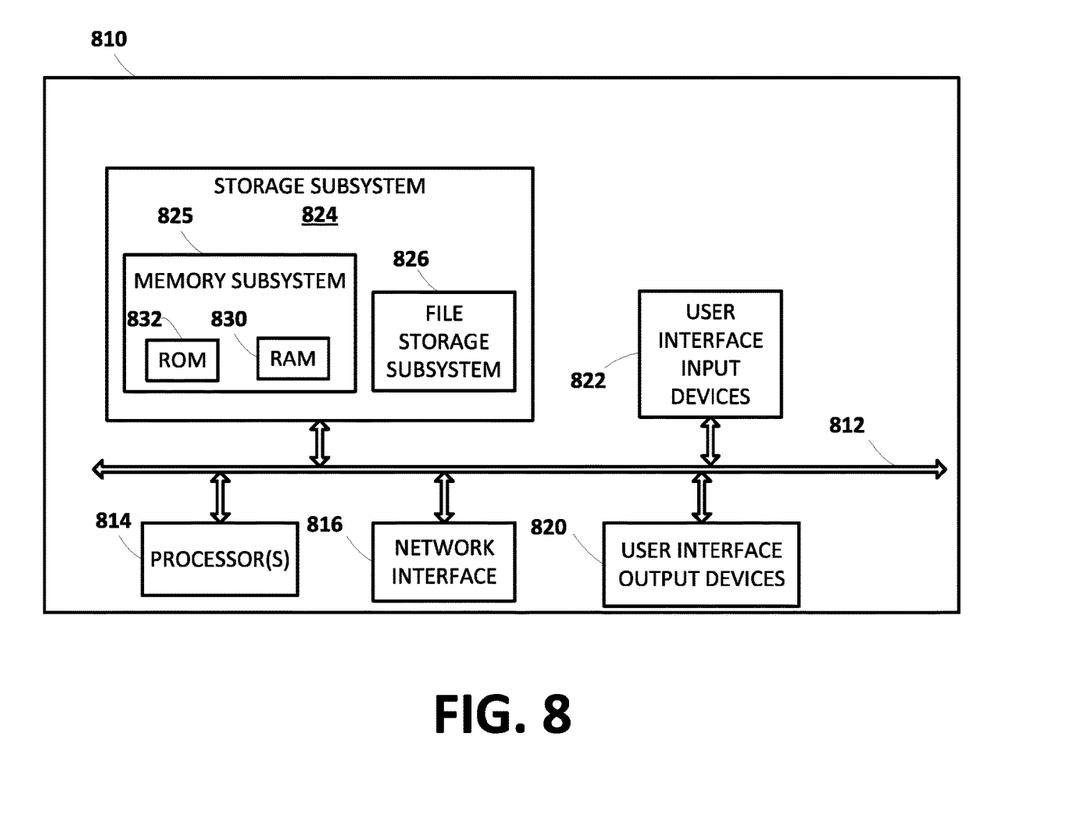
FIG. 8 schematically depicts an example architecture of a computer system.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the processes of FIGS. 3, 4, 5, and/or 6.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In some implementations, a method implemented by one or more processors is provided that includes determining, using a cascading variational autoencoder ("VAE"), whether there is a collision while the robot is performing a robotic task. In some implementations, determining whether there is a collision while the robot is performing the robotic task includes processing an initial robot state of the robot performing the robotic task using a first encoder portion of the cascading VAE to generate a latent space for the initial state. In some implementations, the method includes identifying a next action for performing the task. In some implementations, the method includes processing the initial state and the identified next action using a predictor network portion of the cascading VAE to generate a predicted latent space for the second state. In some implementations, after application of the next action to transition from the initial state to a second state, the method includes processing the second state using a second encoder portion of the cascading VAE to generate a latent space for the second state. In some implementations, the method includes determining whether there is a collision while the robot is performing the task based on the predicted latent space for the second state and the latent space for the second state.

These and other implementations of the technology disclosed herein can include one or more for the following features.

In some implementations, determining whether there is a collision while the robot is performing the task based on the predicted latent space for the second state and the latent space for the second state includes determining a divergence measure based on the predicted latent space for the second state and the latent space for the second state. In some of those implementations, the method further includes determining whether the divergence measure satisfies a threshold value. In some of those implementations, in response to determining the divergence measure satisfies the threshold value, the method further includes determining there is a collision while the robot is performing the task.

In some implementations, determining whether there is a collision while the robot is performing the task based on the predicted latent space for the second state and the latent space for the second state includes generating a predicted sample from the predicted latent space for the second state. In some of those implementations, the method further includes processing the predicted sample using a second decoder portion of the cascading VAE to generate a predicted reconstruction of the second state. In some of those implementations, the method further includes, generating a sample from the latent space for the second state. In some of those implementations, the method further includes processing the sample using the second decoder portion of the cascading VAE to generate a reconstruction of the second state. In some of those implementations, the method further includes determining whether there is a collision while the robot is performing the task based on the predicted reconstruction of the second state and the reconstruction of the second state. In some versions of those implementations, determining whether there is a collision while the robot is performing the task based on the predicted reconstruction of the second state and the reconstruction of the second state includes determining a divergence measure based on the predicted reconstruction of the second state and the reconstruction of the second state. In some versions of those implementations, the method further includes determining whether the divergence measure satisfies a threshold value. In some versions of those implementations, in response to determining the divergence measure satisfies the threshold value, the method further includes determining there is a collision while the robot is performing the task. In some versions of those implementations, determining whether there is a collision while the robot is performing the task based on the predicted reconstruction of the second state and the reconstruction of the second state includes determining a reconstruction divergence measure based on the predicted reconstruction of the second state and the reconstruction of the second state. In some versions of those implementations, the method further includes determining a latent space divergence measure based on the predicted latent space for the second state and the latent space for the second state. In some versions of those implementations, the method further includes determining whether the reconstruction divergence measure satisfies a first threshold value. In some versions of those implementations, the method further includes determining whether the latent space divergence measure satisfies a second threshold value. In some versions of those implementations, in response to determining the reconstruction divergence measure satisfies the first threshold value and the latent space divergence measure satisfies the second threshold value, the method further includes determining there is a collision while the robot is performing the task.

In some versions of those implementations, the latent space for the second state is a continuous latent space, and wherein processing the second state using the second encoder portion of the cascading VAE to generate the latent space for the second state includes generating a mean for the latent space of the second state and a standard deviation for the latent space of the second state. In some versions of those implementations, generating a sample from the latent space for the second state includes generating the sample from the latent space for the second state by randomly sampling from the mean of the latent space of the second state and the standard deviation of the latent space of the second state.

In some implementations, the predicted latent space for the second state is a continuous predicted latent space, and wherein processing the initial state with the identified action using the predictor network portion of the cascading VAE to generate the predicted latent space for the second state includes generating a mean for the predicted latent space of the second state and a standard deviation for the predicted latent space of the second state. In some versions of those implementations, generating the predicted sample from the predicted latent space for the second state includes generating the predicted sample from the predicted latent space for the second state by randomly sampling from the mean of the predicted latent space of the second state and the standard deviation of the predicted latent space of the second state.

In some implementations, processing the second state using the second encoder portion of the cascading VAE to generate the latent space for the second state includes processing a state sequence of the initial state followed by the second state using the second encoder portion of the cascading VAE to generate the latent space for the second state.

In some implementations, determining whether there is a collision while the robot is performing the robot task further includes identifying a second action for performing the task. In some implementations, the method further includes processing the second state with the identified second action using the predictor network portion of the cascading VAE to generate a predicted latent space for the third state. In some implementations, after application of the second action by the robot to transition from the second state to the third state, the method further includes processing the third state using a third encoder portion of the cascading VAE to generate a latent space for the third state. In some implementations, the method further includes determining whether there is a collision while the robot is performing the task based on the predicted latent space for the third state and the latent space for the third state. In some versions of those implementations, processing the third state using the third encoder portion of the cascading VAE to generate the latent space for the third state includes processing a state sequence of the initial state followed by the second state followed by the third state using the third encoder portion of the cascading VAE to generate the latent space for the third state. In some versions of those implementations, determining whether there is a collision while the robot is performing the robot task further includes identifying a third action for performing the task. In some versions of those implementations, the method further includes processing the third state with the identified third action using the predictor network portion of the cascading VAE to generate a predicted latent space for the fourth state. In some versions of those implementations, after application of the third action by the robot to transition from the third state to the fourth state, the method further includes processing the fourth state using a fourth encoder portion of the cascading VAE to generate a latent space for the fourth state. In some versions of those implementations, the method further includes determining whether there is a collision while the robot is performing the task based on the predicted latent space for the fourth state and the latent space for the fourth state. In some versions of those implementations, processing the fourth state using the fourth encoder portion of the cascading VAE to generate the latent space for the fourth state includes processing a state sequence of the initial state followed by the second state followed by the third state followed by the fourth state using the fourth encoder portion of the cascading VAE to generate the latent space for the fourth state. In some versions of those implementations, the fourth state is the last state in the state sequence of the robot performing the task, and further including determining there is no collision while the robot is performing the task based on the predicted latent space for the fourth state and the latent space for the fourth state. In some version of those implementations, in response to determining there is no collision while the robot is preforming the task based on the predicted latent space for the fourth state and the latent space for the fourth state, determining there is no collision while the robot is preforming the task.

In some implementations, a method implemented by one or more processors is provided, the method including training a cascading variational autoencoder ("VAE") to determine whether there is a collision while a robot is performing a task, where training the cascading VAE includes processing an initial state of the robot performing the task using a first encoder portion of the cascading VAE to generate a latent space for the initial state. In some implementations, the method includes generating a sample of the latent space for the initial state. In some implementations, the method includes processing the sample of the latent space for the initial state using a first decoder portion of the cascading VAE to generate a predicted reconstruction of the initial state. In some implementations, the method includes generating a loss based on the initial state and the predicted reconstruction of the initial state. In some implementations, the method includes updating one or more portions of the first encoder and one or more portions of the first decoder based on the generated loss.

These and other implementations of the technology disclosed herein can include one or more of the following features.

In some implementations, training the cascading VAE further includes processing a second state of the robot performing the task using a second encoder portion of the cascading VAE to generate a latent space for the second state. In some implementations, the method further includes generating a sample of the latent space for the second state. In some implementations, the method further includes processing the sample of the latent space for the second state using a second decoder portion of the cascading VAE to generate a predicted reconstruction of the second state. In some implementations, the method further includes generating a second loss based on the second state and the predicted reconstruction of the second state. In some implementations, the method further includes updating one or more portions of the second encoder and one or more portions of the second decoder based on the generated second loss. In some versions of those implementations, training the cascading VAE further includes processing, using a predictor network of the cascading VAE, the latent space for the initial state and an action applied by the robot to transition from the initial state to the second state in performing the task to generate a predicted latent space for the second state. In some versions of those implementations, the method further includes generating a latent space loss based on the latent space for the second state and the predicted latent space for the second state. In some versions of those implementations, the method further includes updating one or more portions of the predictor network based on the generated latent space loss. In some versions of those implementations, training the cascading VAE further includes processing a third state of the robot performing the task using a third encoder portion of the cascading VAE to generate a latent space for the third state. In some versions of those implementations, the method further includes generating a sample of the latent space for the third state. In some versions of those implementations, the method further includes processing the sample of the latent space for the third state using a third decoder portion of the cascading VAE to generate a predicted reconstruction of the third state. In some versions of those implementations, the method further includes generating a third loss based on the third state and the predicted reconstruction of the third state. In some versions of those implementations, the method further includes updating one or more portions of the third encoder and one or more portions of the third decoder based on the generated third loss.

In some versions of those implementations, training the cascading VAE further includes processing, using the predictor network of the cascading VAE, the latent space for the second state and an action applied by the robot to transition from the second state to the third state in performing the task to generate a predicted latent space for the third state. In some versions of those implementations, the method further includes generating an additional latent space loss based on the latent space for the third state and the predicted latent space for the third state. In some versions of those implementations, the method further includes updating one or more portions of the predictor network based on the generated additional latent space loss.

In some implementations, the cascading VAE is trained using a training set where the robot is performing the task without a collision. In some versions of those implementations, the training set captures every sequence of actions of the robot performing the task without a collision.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   determining, using a cascading variational autoencoder ("VAE"), whether there is a collision while a robot is performing a robotic task, wherein determining whether there is a collision while the robot is performing the robotic task comprises:
     processing an initial robot state of the robot performing the robotic task using a first encoder portion of the cascading VAE to generate a latent space for the initial state;
     identifying a next action for performing the task;
     processing the initial state and the identified next action using a predictor network portion of the cascading VAE to generate a predicted latent space for a second state;
     after application of the next action to transition from the initial state to the second state, processing the second state using a second encoder portion of the cascading VAE to generate a latent space for the second state; and
     determining whether there is a collision while the robot is performing the task based on the predicted latent space for the second state and the latent space for the second state.

2. The method of claim 1, wherein determining whether there is a collision while the robot is performing the task based on the predicted latent space for the second state and the latent space for the second state comprises:
   determining a divergence measure based on the predicted latent space for the second state and the latent space for the second state;
   determining whether the divergence measure satisfies a threshold value; and
   in response to determining the divergence measure satisfies the threshold value, determining there is a collision while the robot is performing the task.

3. The method of claim 1, wherein determining whether there is a collision while the robot is performing the task based on the predicted latent space for the second state and the latent space for the second state comprises:
   generating a predicted sample from the predicted latent space for the second state;
   processing the predicted sample using a second decoder portion of the cascading VAE to generate a predicted reconstruction of the second state;
   generating a sample from the latent space for the second state;
   processing the sample using the second decoder portion of the cascading VAE to generate a reconstruction of the second state; and
   determining whether there is a collision while the robot is performing the task based on the predicted reconstruction of the second state and the reconstruction of the second state.

4. The method of claim 3, wherein determining whether there is a collision while the robot is performing the task based on the predicted reconstruction of the second state and the reconstruction of the second state comprises:
   determining a divergence measure based on the predicted reconstruction of the second state and the reconstruction of the second state;
   determining whether the divergence measure satisfies a threshold value; and
   in response to determining the divergence measure satisfies the threshold value, determining there is a collision while the robot is performing the task.

5. The method of claim 3, wherein determining whether there is a collision while the robot is performing the task based on the predicted reconstruction of the second state and the reconstruction of the second state comprises:
   determining a reconstruction divergence measure based on the predicted reconstruction of the second state and the reconstruction of the second state;
   determining a latent space divergence measure based on the predicted latent space for the second state and the latent space for the second state;
   determining whether the reconstruction divergence measure satisfies a first threshold value;
   determining whether the latent space divergence measure satisfies a second threshold value;
   in response to determining the reconstruction divergence measure satisfies the first threshold value and the latent space divergence measure satisfies the second threshold value, determining there is a collision while the robot is performing the task.

6. The method of claim 3, wherein the latent space for the second state is a continuous latent space, and wherein processing the second state using the second encoder portion of the cascading VAE to generate the latent space for the second state comprises:
   generating a mean for the latent space of the second state and a standard deviation for the latent space of the second state.

7. The method of claim 6, wherein generating a sample from the latent space for the second state comprises:
   generating the sample from the latent space for the second state by randomly sampling from the mean of the latent space of the second state and the standard deviation of the latent space of the second state.

8. The method of claim 3, wherein the predicted latent space for the second state is a continuous predicted latent space, and wherein processing the initial state with the identified action using the predictor network portion of the cascading VAE to generate the predicted latent space for the second state comprises:
   generating a mean for the predicted latent space of the second state and a standard deviation for the predicted latent space of the second state.

9. The method of claim 8, wherein generating the predicted sample from the predicted latent space for the second state comprises:
   generating the predicted sample from the predicted latent space for the second state by randomly sampling from the mean of the predicted latent space of the second state and the standard deviation of the predicted latent space of the second state.

10. The method of claim 1, wherein processing the second state using the second encoder portion of the cascading VAE to generate the latent space for the second state comprises:
    processing a state sequence of the initial state followed by the second state using the second encoder portion of the cascading VAE to generate the latent space for the second state.

11. The method of claim 1, wherein determining whether there is a collision while the robot is performing the robot task further comprises:
    identifying a second action for performing the task;

processing the second state with the identified second action using the predictor network portion of the cascading VAE to generate a predicted latent space for a third state;

after application of the second action by the robot to transition from the second state to the third state, processing the third state using a third encoder portion of the cascading VAE to generate a latent space for the third state; and determining whether there is a collision while the robot is performing the task based on the predicted latent space for the third state and the latent space for the third state.

12. The method of claim 11, wherein processing the third state using the third encoder portion of the cascading VAE to generate the latent space for the third state comprises:

processing a state sequence of the initial state followed by the second state followed by the third state using the third encoder portion of the cascading VAE to generate the latent space for the third state.

13. The method of claim 11, wherein determining whether there is a collision while the robot is performing the robot task further comprises:

identifying a third action for performing the task;

processing the third state with the identified third action using the predictor network portion of the cascading VAE to generate a predicted latent space for a fourth state;

after application of the third action by the robot to transition from the third state to the fourth state, processing the fourth state using a fourth encoder portion of the cascading VAE to generate a latent space for the fourth state; and determining whether there is a collision while the robot is performing the task based on the predicted latent space for the fourth state and the latent space for the fourth state.

14. The method of claim 13, wherein processing the fourth state using the fourth encoder portion of the cascading VAE to generate the latent space for the fourth state comprises:

processing a state sequence of the initial state followed by the second state followed by the third state followed by the fourth state using the fourth encoder portion of the cascading VAE to generate the latent space for the fourth state.

15. The method of claim 14, wherein the fourth state is the last state in the state sequence of the robot performing the task, and further comprising:

determining there is no collision while the robot is performing the task based on the predicted latent space for the fourth state and the latent space for the fourth state;

in response to determining there is no collision while the robot is preforming the task based on the predicted latent space for the fourth state and the latent space for the fourth state, determining there is no collision while the robot is preforming the task.

16. A method implemented by one or more processors, the method comprising:

training a cascading variational autoencoder ("VAE") to determine whether there is a collision while a robot is performing a task, where training the cascading VAE comprises:

processing an initial state of the robot performing the task using a first encoder portion of the cascading VAE to generate a latent space for the initial state;

generating a sample of the latent space for the initial state;

processing the sample of the latent space for the initial state using a first decoder portion of the cascading VAE to generate a predicted reconstruction of the initial state;

generating a loss based on the initial state and the predicted reconstruction of the initial state; and updating one or more portions of the first encoder and one or more portions of the first decoder based on the generated loss.

17. The method of claim 16, wherein training the cascading VAE further comprises:

processing a second state of the robot performing the task using a second encoder portion of the cascading VAE to generate a latent space for the second state;

generating a sample of the latent space for the second state;

processing the sample of the latent space for the second state using a second decoder portion of the cascading VAE to generate a predicted reconstruction of the second state;

generating a second loss based on the second state and the predicted reconstruction of the second state; and updating one or more portions of the second encoder and one or more portions of the second decoder based on the generated second loss.

18. The method of claim 17, wherein training the cascading VAE further comprises:

processing, using a predictor network of the cascading VAE, the latent space for the initial state and an action applied by the robot to transition from the initial state to the second state in performing the task to generate a predicted latent space for the second state;

generating a latent space loss based on the latent space for the second state and the predicted latent space for the second state; and updating one or more portions of the predictor network based on the generated latent space loss.

19. The method of claim 18, wherein training the cascading VAE further comprises:

processing a third state of the robot performing the task using a third encoder portion of the cascading VAE to generate a latent space for the third state;

generating a sample of the latent space for the third state;

processing the sample of the latent space for the third state using a third decoder portion of the cascading VAE to generate a predicted reconstruction of the third state;

generating a third loss based on the third state and the predicted reconstruction of the third state; and updating one or more portions of the third encoder and one or more portions of the third decoder based on the generated third loss.

20. The method of claim 19, wherein training the cascading VAE further comprises:

processing, using the predictor network of the cascading VAE, the latent space for the second state and an action applied by the robot to transition from the second state to the third state in performing the task to generate a predicted latent space for the third state;

generating an additional latent space loss based on the latent space for the third state and the predicted latent space for the third state; and updating one or more portions of the predictor network based on the generated additional latent space loss.

\* \* \* \* \*